US008554651B2

(12) United States Patent
Rinne et al.

(10) Patent No.: US 8,554,651 B2
(45) Date of Patent: Oct. 8, 2013

(54) METHOD AND ARRANGEMENT FOR TRANSACTION PROCESSING IN CONNECTION WITH MOBILE TELECOMMUNICATION (75) Inventors: Tuija Rinne, Espoo (FI); Matti Salonen, Espoo (FI)

(73) Assignee: Comptel Corporation, Helsinki (FI)

( * ) Notice: Subject to any disclaimer, the term of this patent is extended or adjusted under 35 U.S.C. 154(b) by 1670 days.

(21) Appl. No.: 10/497,601

(22) PCT Filed: Dec. 2, 2002

(86) PCT No.: PCT/FI02/00968
§ 371 (c)(1),
(2), (4) Date: Jun. 3, 2004

(87) PCT Pub. No.: WO03/048983
PCT Pub. Date: Jun. 12, 2003

(65) Prior Publication Data
US 2005/0015346 A1    Jan. 20, 2005

(30) Foreign Application Priority Data
Dec. 5, 2001    (FI) ...................................... 20012406

(51) Int. Cl.
*G06Q 40/00*    (2012.01)
(52) U.S. Cl.
USPC .................. 705/35; 705/45; 705/67; 705/1.1; 705/40; 705/37
(58) Field of Classification Search
USPC ......... 705/45, 35, 1.1, 51, 67, 40; 379/88.16, 379/67.1; 709/219, 203
See application file for complete search history.

(56) References Cited

U.S. PATENT DOCUMENTS

| 5,794,221 | A  | * | 8/1998  | Egendorf ........................ 705/40 |
| 5,905,736 | A  | * | 5/1999  | Ronen et al. ................... 370/546 |
| 6,230,201 | B1 | * | 5/2001  | Guck et al. ..................... 709/228 |
| 2001/0037361 | A1 | * | 11/2001 | Croy ............................. 709/203 |

FOREIGN PATENT DOCUMENTS

| EP | 0 924 630 A1 | 6/1999 |
| EP | 1 253 760 A1 | 10/2002 |
| EP | 1 257 129 A1 | 11/2002 |
| WO | WO 99/31610 A1 | 6/1999 |

(Continued)

OTHER PUBLICATIONS

TRADERSmagazine.com "Merrin's Solution to Liquidity Problem: A Better Mousetrap to Crush Market Impact?"—by: Peter Chapman; Sep. 2000.*

*Primary Examiner* — John H Holly
(74) *Attorney, Agent, or Firm* — Birch, Stewart, Kolasch & Birch, LLP (57) ABSTRACT A method in a telecommunications system, in which there are at least three parties involved in the system's exploitation, namely at least one service provider capable of providing services for at least one user, and at least one operator responsible for the operation of the telecommunications system, wherein payable services delivered to an authorized and authenticated user are identified, and in which system each service transaction as well as the user are identified. The definition of the transaction flow is done on the basis of at least one predefined transaction rule and the parties involved are allowed to dynamically alter the function of at least one of the rules and/or the execution order of multiple rules for creating a flexible transaction flow.

12 Claims, 8 Drawing Sheets

(56) References Cited

FOREIGN PATENT DOCUMENTS

| WO | WO 01/65498 A1 | 9/2001 |
| WO | WO 01/75642 A2 | 10/2001 |
| WO | WO 02/13499 A1 | 2/2002 |

* cited by examiner

FIG.8 ns and vowel matras# METHOD AND ARRANGEMENT FOR TRANSACTION PROCESSING IN CONNECTION WITH MOBILE TELECOMMUNICATION The present invention relates to a method, according to Claim 1 for transaction processing in connection with telecommunication, especially mobile telecommunication.

Traditionally the clients using telecommunication services have been forced to register in advance to systems, which provide the desired services. One example of this are faximile services in a mobile phone network. The service has been charged for based on a predetermined rate and the services have been paid for in a predetermined manner.

European patent application 0924630 describes this kind of a method of downloading resources to a user from a content server over a data network. A resource request message is sent from the user and is intercepted at a proxy located in the data network between the user and the content server. A header request is sent from the proxy to the content server, requesting the content server to transmit a header that is associated with the requested resource to the proxy. The header is received at the proxy, which determines whether the header contains billing or access restrictions. In the event that the header contains billing or access restrictions, the user's right to receive the requested resource is authenticated and, providing the user is authenticated, the resource request message is delivered from the proxy to the content server and subsequently the resource is downloaded from the content server to the user.

However, the method in accordance with patent application 0924630 does not provide service management views for different stakeholders and therefore it is not possible to affect the transaction management flow. From the user's viewpoint, typical for the invention is that all services are allowed without the need to register per service in advance.

The allowed paying methods are specified. Examples of payment methods are: invoiced afterwards, paid by making an immediate bank transaction, prepaid, paid by credit card, etc. No information on which one of these methods is used is required before the requested service related to the transaction actually takes place. All parties (user, operator, service provider) can dynamically affect the paying method. The applied payment method can be dynamically defined each time for example on the basis of user information, service type, time or place.

WO-9962272 describes a provision support system, especially for sessions with plurality of participants. Pricing information can be changed during the sessions. However, this publication does not describe dynamical transaction flow management based on predefined transaction rules.

The invention allows the use of the services in different roles. For example, a child whose parents pay the costs, a firm paying for certain services, an employer financing certain services himself.

The user is authenticated on different levels depending on, for example, the service or paying method.

The anonymity of the user to the service providers can be controlled. Rules for all the above mentioned criteria can be set and changed by all parties (operator, service provider, user) in all their roles.

The present invention further relates to a method for transaction processing in connection with telecommunication, especially mobile telecommunication in such a way that the user has in practice access to all services and possible bating procedures can be dynamically activated by rules set by all parties (user, service provider or operator). This objective is achieved by a novel transaction processing in which transaction rules associated with a content request are determined. The rules if any, are executed when connections to external systems are established.

More specifically, the method according to the invention is characterized by what is stated in the characterizing clause of Claim 1.

Considerable advantages are gained with the aid of the invention. With the invention, mobile telephone and Internet users can benefit from flexible use of the services of the service providers. Further, flexible and dynamic barring of services like adult entertainment may be executed. The system also allows flexibility in billing procedures.

Advantages for the Teleoperators are:
  Mobile data services can be charged not only through flat monthly fee but also at the same time as the services are used.
  Services can be priced in a flexible manner.
  Effective control of credit risks, which is especially important when the operator acts as a broker for the services. As a consequence, the operator gets new users and increases turnover because new payment methods can be offered for new user groups.
  Delays in payments decrease because paying is not only based on monthly after charging but prepayment, credit cards and account transfer can also be used.
  New services can be offered to the users. In some countries lottery services are not allowed when they are postpaid. The present invention enables direct charging for the operator and the problem is thus solved. Also multiple prepayments for several service providers can be avoided.
  Charging costs decrease and in principle the operators can give over after charging.

Advantages for the User are:
  The best suitable paying methods can be used.
  The costs can be easily controlled and services flexibly barred.
  New services easily available and controllable.

Advantages for the Service Providers are:
  Services can be priced in a flexible manner.
  Effective control of credit risks.
  Debit collection costs may be reduced.
  Cost-effective way to handle increased amounts of transactions.
  Offering services, billing and realization easy.

In the following, the invention is examined with the aid of examples and with reference to the accompanying figures.

Figure 1:
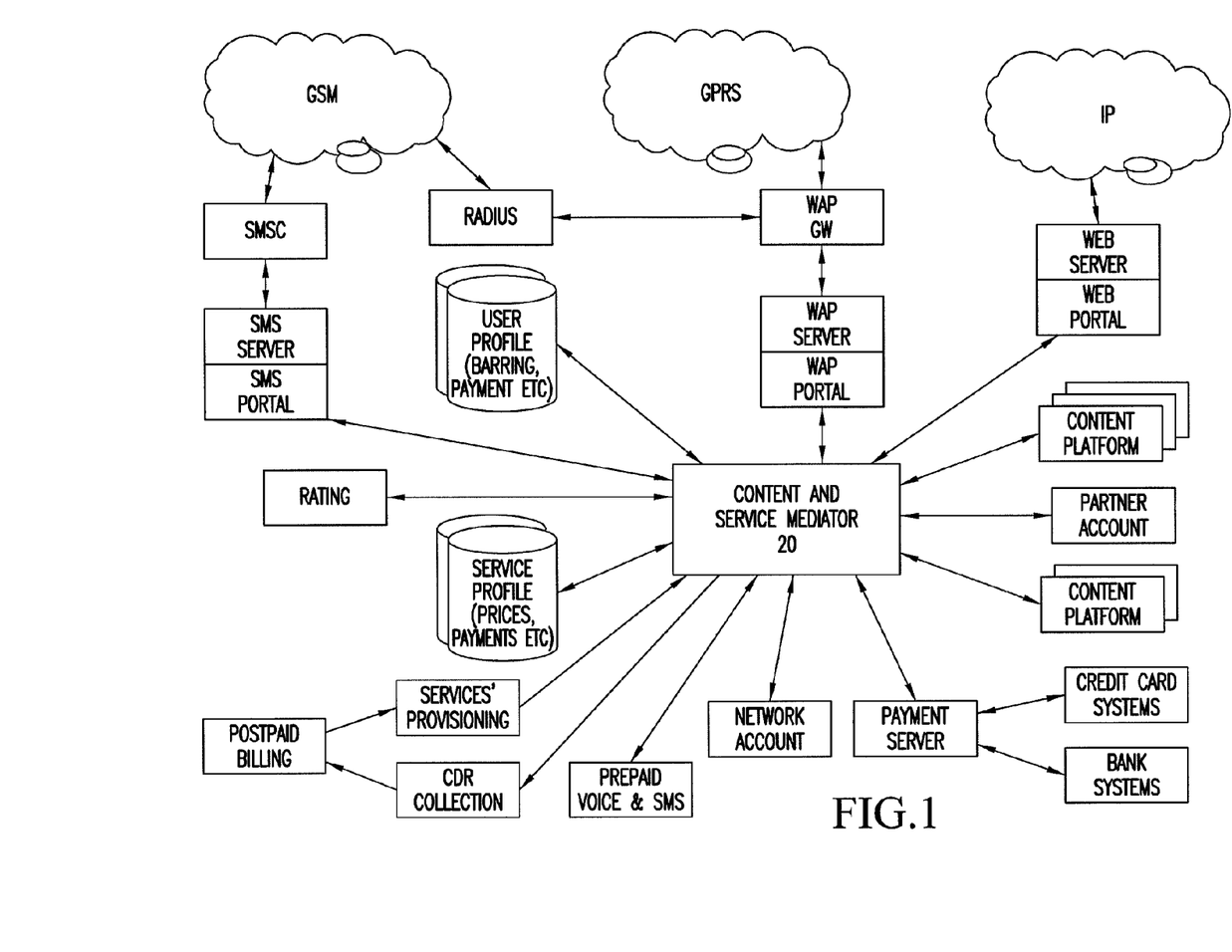
FIG. 1 illustrates a system in which the invention can be implemented as a block diagram.

Referring to FIG. 1, the most essential component of the invention is Content and Service Mediator 20 which among other things dynamically controls permissible services and payment methods, roles in which users are using the services, authenticates the users as well as hides users' real identity from external systems (for example, content platforms) according to the rules set by the users and operators.

Content and Service Mediator 20 has interfaces with various supporting systems, for example:
- rating system for pricing the services
- prepaid and postpaid systems
- network account and payment server for supporting various payment methods
- partner account for supporting various kinds of revenue sharing schemes among operators and providers of the actual services
- content and service platforms for providing users with the actual services Content and Service Mediator makes content-based billing possible online. This means that with Content and Service Mediator the operator can bill the content user based on the real-time value of the content, totally independent of how much bandwidth it has needed or how long a session has been. For example, the price of a music video can be based on who is the performer or on the top-ten ranking of the video in question. Thus, two music videos that the operator bills the user for can have different prices, independently of the file size they require.

Content and Service Mediator is able to interact with the various systems and parties involved in the content transaction, such as a content service platform—run by the operator itself or by a 3rd party content provider, content buyer, financial institution, pre-paid system and billing system.

Content and Service Mediator can co-exist with traditional mediation systems, such as Comptel MDS. This allows the latter to remain a single contact point to billing systems while Content and Service Mediator is responsible for other payment methods and on-line transaction management.

Content and Service Mediator is part of the large software bundle that leverages operators' service offering via advanced service charging and mediation options. Content and Service Mediator works as a billing and service mediator component between operators' portals (mobile/internet) and service providers' applications. In other words, it offers enhanced authentication and authorisation functionalities to verify access rights of the end-user and correlates the requested service/content with appropriate available payment method (accounting).

Figure 2:
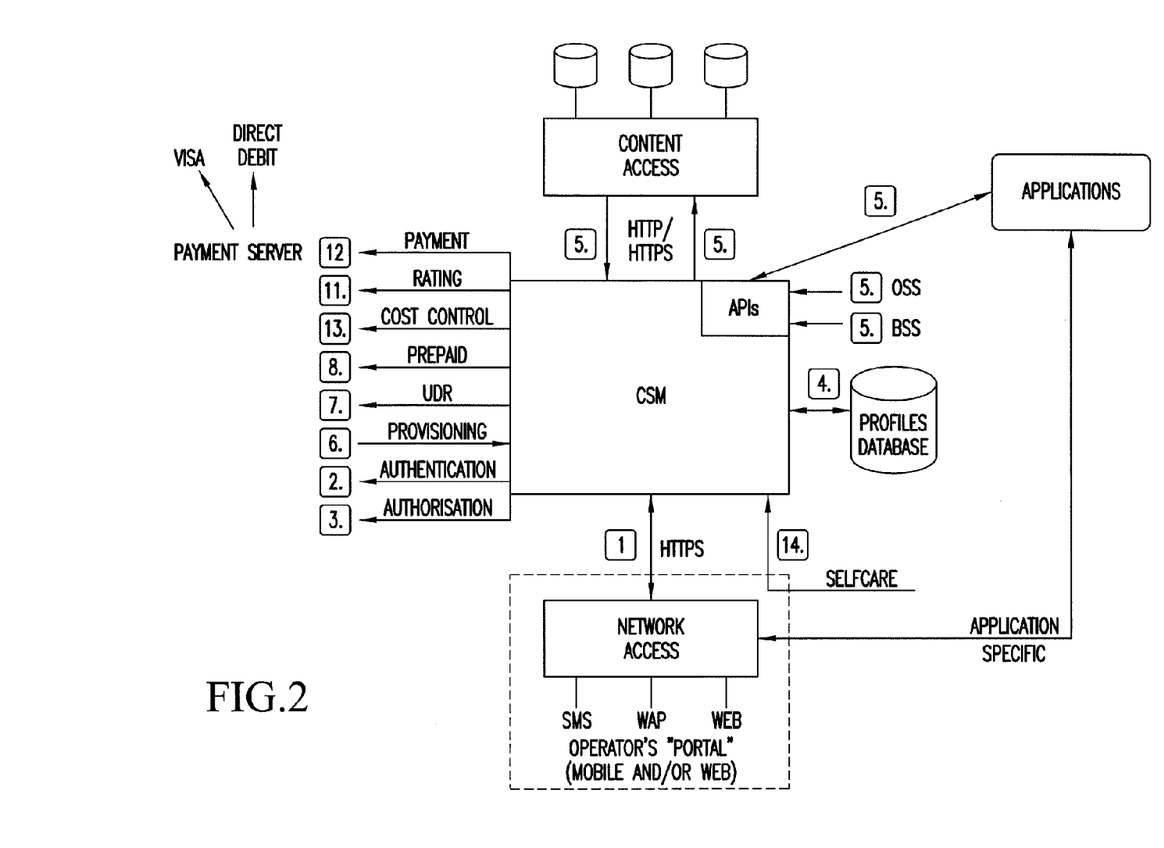
FIG. 2 illustrates Content and Service Mediator's (CSM) logical decomposition and the most important reference points to external systems as a block diagram.

FIG. 2 depicts Content and Service Mediator's (CSM) logical decomposition and the most important reference points to external systems as a block diagram.

The most important boundary interfaces of the CSM system are:
1. communication interface to network operator's portal infrastructure
2. interface to an internal or external authentication database
3. interface to an internal or external authorisation database
4. interface to internal customer and service profile database
5. communication interface to external content and application management systems
6. interface to external data provisioning system
7. file based interface to billing mediators
8. real-time communication interface to external prepaid systems
9. management interface for the operations support personnel
10. management interface for the business support personnel
11. real-time interface to external service rating engine
12. interface to a payment server (for accessing external billing accounts)
13. interface to a cost control system
14. self-care interface for the end-user Introduction to Authentication Authentication means to find out who the user is and ensure that the user is who he claims to be. There are four levels of authentication: weak, normal, strong and licence based. Weak means MSISDN to user ID mapping, normal means user name and password to user ID mapping, strong means PKI/smart card identification to user ID mapping and licence means licence key to user ID mapping. The required authentication level may depend on the aimed service as well as the account to be used and the chosen payment method.

Following attributes are defined for the authentication process:

| Critical attributes | Explanation |
| --- | --- |
| Authentication domain | The actual domain where the authentication is done. |
| Authentication method | This defines the actual method or technique for authenticating the user. |
| Authentication parameter(s) | This defines how the user and session will be authenticated. |
| SessionID | An authenticated session gets identification where it can be recognized. |
| UserID | The user must identify himself to be recognized and use the services. |

Introduction to Authorisation

Authorisation means finding out whether the user is allowed to use a requested service. Typically there are, for example, the following barring settings, which depend on the role of the user, in addition to how the operator, service provider and user have defined the usage:
- user may have barring to some services/service groups
- the account the user is using may have barring to some services/service groups
- user may have a price limit to used services
- the account may have a price limit
- the service may allow only some access methods
- the service may allow only some payment methods
- in case of prepaid services the user may not have enough balance on the prepaid account
- user may have some maximum balance per day/month
- the account may have some maximum balance per day/month.

In addition to these, the user may need to perform price confirmation before the service is provided. This could also be understood to be a part of authorisation.

Hence, first CSM finds out whom the user is and which service is he is trying to use. CSM also ensures that the end-user really is who he claims to be. Then CSM may inquire which account and payment method the user wants to use. These may also be predefined (default method) by the user, operator and/or provider of the service. Next stage is to authorise the user to see if the user is allowed to use the service. The price may then be confirmed, and following the possible price confirmation the price of the service is determined. Next, optional balance checks (prepaid) or cost control (postpaid) are performed. After these steps the actual service delivery can be made. Finally, in the case of prepaid payment the balance is decreased, in the case of postpaid an Event Record (ER) or Usage Detail Record (UDR) is delivered to a postpaid system or in the case of immediate payment a bank or credit card transaction is performed. Possible revenue sharing between operator and service provider is done through the partner account where the service's usage is recorded.

Introduction to Pricing and Accounting

Users are charged for the used services. The pricing and accounting process contains a number of steps. It starts when a user is authenticated and a session is launched. Pricing and accounting also determines where CSM gets the price for the service and in what stage of the transaction flow it gets it. A pricing domain can be linked to the active authenticated session and content service specific pricing information can be determined as a function of any number of attributes.

This may mean decreasing the balance on the prepaid account if prepaid payment method was used, executing the payment through a payment server if such a payment method was used and/or generation of ERs both to the transaction database and to a file to be fetched by a mediation device. Also in the case of postpaid payment method when cost control is in use, CSM needs to control the balance increasing through the matter supporting system.

The source of the price can be:
A) flat rate price from internal database (serviceid=price)
B) external database (f(x, y, z)=price)
C) the content/service platform sends TARIFFCLASS in the response for which the corresponding price can be found.
C.1) from internal database (TARIFFCLASS=price)
C.2) from external database (f(TARIFFCLASS, x, y, z)=price)
D) the content/service platform sends an exact price
E) CSM can send a separate price request to content/service platform, in which case the price comes:
E.1) from internal database (TARIFFCLASS=price)
E.2) from external database (f(TARIFFCLASS, x, y, z)=price)
E.3) as an exact price from content/service platform Each of these alternatives can also include price confirmation.

The price may be determined:
Before the execution of the service
During the execution of the service
After the execution of the service So for each service both the stage when the price is fetched and where the information can be found are defined. In the case of tariff class from content/service platform, CSM is then also able to define where the tariff class is mapped to the price. Alternatives C) and D) above are used for prepaid. Of course CSM may block the delivery of the service reply to the end-user if the end-user does not have enough balance on the prepaid account. However, in some cases it might be that the reply is not the object to be accounted, but simply, for example, a confirmation message about transaction and the object to be accounted is, for example, a soft drink bottle that has already been delivered by an automate.

In some cases the tariff class may be written to ER and the mediation device or some postrating system calculates the actual price. However, this cannot be used with prepaid or cost control because these systems need to know the exact price.

It may also be that service transactions are long, that is, transactions may contain several requests and replies. At least the following possible charging scenarios for these:
1. Charging is done when first request/reply is processed
2. Charging is done when last request/reply is processed
3. Each request/reply is charged separately (although they have same transaction ID, handled by the mediation device)

Following parameters are defined for the pricing and accounting process:

| Critical attributes | Explanation |
| --- | --- |
| ContentID | The identification of a single content/service. |
| ContentgroupID | The identification of a group of (similar) contents/services. |
| PricingDomain | The actual domain where the pricing is done. |
| Price source | The location for the 'raw' price. |

Introduction to Session

All content and service mediation processing is done in real-time. This requires an authenticated session for linking the correct domains and operations for the events. A session is launched when a user has been authenticated. During a session the user can perform any number of service management or transaction management related actions. A session is terminated when the user logs out of the system.

Introduction to Operational Models

There are several alternatives to how an operator wants to deal with the content services and content providers. Any combination of the following models apply.

Operator recognises only his own content as chargeable items and does not provide any service management functions for external parties.

Operator allows external content services but only sees them as chargeable items. This is equal to the situation where there are several external content databases and service management systems, which are not of an interest to the operator. The operator only wants to provide a charging mechanism. This would require that the price information is attached to the transaction triggering mechanism.

Operator allows external content services and is interested in providing service management functions. These would include organising, pricing and publishing.

Operator wants to use content provider management functions such as content service contracts in order to manage credit risk.

Content and Service Mediation Environment

Content and Service Mediation is a process of bringing together the various elements needed to manage and charge for content and services.

Figure 3:
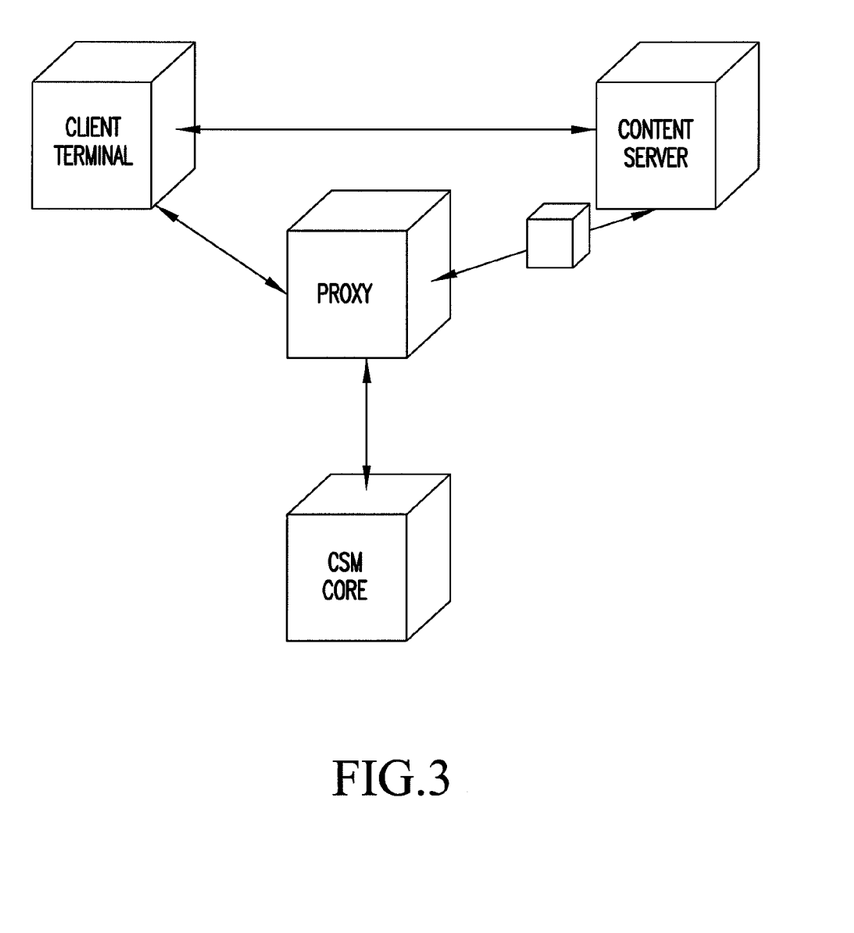
FIG. 3 illustrates a transaction processing method according to the invention as a flow chart.

Content and Service Mediation mainly consists of two major concepts:
Transaction Management
Service Management Transaction Management Online transaction mediation requires an active authenticated session between the user terminal and CSM core. In accordance with FIG. 3, CSM core is the component that manages the transaction flow. It is able to interface several external components and domains. CSM core does not require any database by default. It is able to handle a basic transaction management flow with attributes that are loaded to the main memory during startup.

There are several mechanisms that can be used to trigger the transaction management flow. All of these mechanisms also trigger the session authentication.

Content servers are hidden by a proxy that initiates the transaction management flow.

Content server itself contains a built-in mechanism that initiates the transaction management flow.

Content service initiates the transaction management flow.

Transaction Management

Transaction management is responsible for the overall function of transaction flow. This means the request processing, pattern matching, rule execution and content delivery. It determines the executed steps and their internal order.

Transaction flow defines the steps that are executed when a new service request is received. The transaction flow is described in more detail in FIG. 4.

Figure 4:
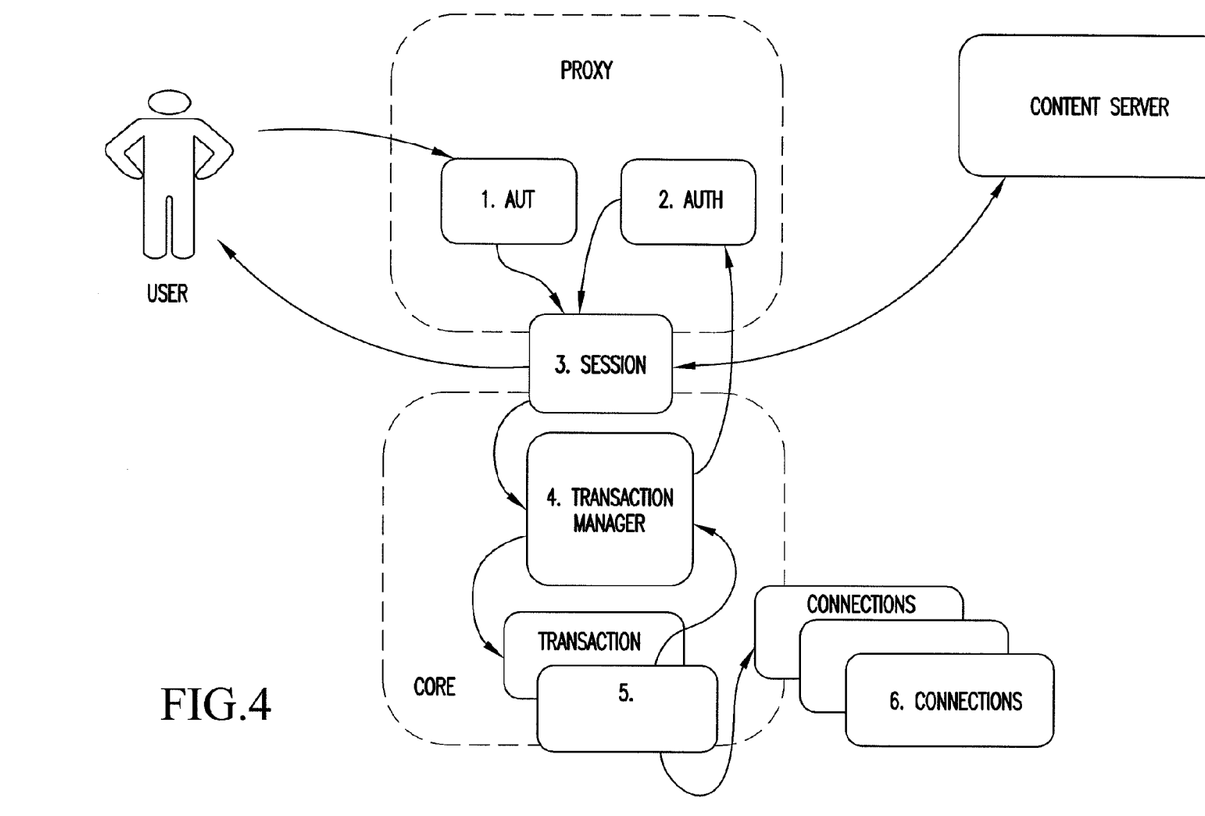
FIG. 4 illustrates the process between the Session, Transaction manager and Authorisation module as a block diagram.

For each incoming content request, the Transaction Manager checks whether there are any specified rules that are associated with this particular request. The check can be done according to:

Content provider identifier
Content identifier
Content group identifier.
Channel identifier It there is a match, the system executes a transaction rule.

Single transaction rule is able to:

Execute another rule

Return to Authorisation module with flags via the Transaction Manager

Return to Authorisation module with no flags via the Transaction Manager

Transaction rules execute connections to external systems. These connections can send or receive information that can be used for the following purposes:

Pricing
Billing
Barring
Authentication
Authorisation

Rules are operational units (short programs) in the system (CSM). In normal operation the rules are fixed elements, in other words they cannot be changed by the parties (user, operator, service provider). The rules can be indirectly affected by attributes, which can be used (and altered) by all parties. Attributes affect mainly the order of the executed rules (but also the operation of each rule). In other words, a rule operates in a different way depending on the used attribute.

Transaction Flow/Chain of Actions

Transaction flow or chain of actions consists of discrete stages that can (in theory) be executed in several different orders. Each of these stages involves some prerequisites, actions, parameters and results. The execution order of these stages is of course dependent on the prerequisites. This allows the coarse-grain management of the transaction flow. The number and order of the steps can be altered.

Referring to FIG. 4 the following stages can be identified as the basic building blocks in the process of managing the transaction flow of a single service request:

1. Service identification
2. User identification
3. User authentication
4. Service authorisation
5. Price calculation
6. Price confirmation
7. Payment method/balance check
8. Service delivery
9. Payment actions
10. Transaction storing
11. Transaction identification
12. EDR generation Transaction flow and the management functions are invoked by a content request. Authentication module 1 receives the request. It takes care of the two preliminary stages of the whole transaction flow processing: service identification and user identification.

Authentication module 1 checks if the user already has a session. Session concept is based on the HTTP protocol and the use of cookies. Session module 3 contains information about the session. If a valid session does not exist, a temporary session is created. This is done according to user identification parameters.

Note This session is not considered authenticated or authorised to perform any monetary actions.

Service identification relates to choosing the right transaction flow. The initial process is pattern matching. This is done in the Transaction manager 4 module. If there is a match in the incoming content request and the content attributes stored to the database, the system starts executing the following stages in the matched transaction flow.

To sum this up, each transaction is managed by two compulsory stages: service identification and user identification. The following transaction flow stages (3-12) depend on the predefined transaction rules (5). Transaction manager (4) is responsible for executing the correct transaction flow, which consists of transaction rules.

There is also another mechanism for starting the transaction flow process. If the pattern match process fails, the system fetches the content from the content server. The content is not yet delivered to the user, but the system checks if a CSM_CHARGEABLE cookie is present. Valid values for the cookie are YES or NO. If the value of this cookie is NO, the file can be transmitted through the proxy without any interaction with the CSM Core, that is, the file is transmitted without a fee to the end-user. The default value is YES and if the cookie contains this value, the default transaction flow is triggered.

Service Identification

In this stage we resolve the used service from the request parameters.

Actions
Resolve service name/identification
Query service profile from the database
Query service transaction flow from the database Results
Service ID
Service group ID
Content Provider ID
Transaction Flow
Accepted access methods
Accepted payment methods
Price settings for the service (source of price, is price confirmation needed)
Required authentication level User Identification In this stage we resolve who the content buyer is. This is again done from the request parameters. Here we will also find out user (default) account and other profile parameters, such as required authentication level, service barrings, price barrings and need for price confirmation Actions
   Resolve user name/identifier
   Query user profile(s) from database
Parameters
   Parameters from service request
Results
   User ID
   User group ID
   Account ID
   Service barrings
   Price barrings
   Need for price confirmation

User Authentication

In this stage we will ensure that the user is who he claims to be. If the stage 'User identification' was not executed before this stage, we will also resolve who the user is. If 'user ID' and 'account ID' is known, we will already know required authentication level.

The required authentication level according to 'service ID' is also know at this stage Actions:
   Check the required authentication level
   Get authentication from user
   Validate authentication
Parameters:
   User ID
Result:
   The user is authenticated
   Session is created

Service Authorization

In this stage we will find out if the user is allowed to use requested service. This includes checking of service subscription, service barrings both for the user and the account he is using.
   User and service grouping
   Accept payment methods
Pre Requisites:
   Service identification
   User identification
   User authentication
Actions:
   None
Parameters:
   User ID
   User group ID
   Service ID
   Service group ID
Results:
   Service is authorised for the authenticated user.

Price Calculation

In this stage we will check the service profile information resolved in the service identification stage. It is determined whether the price information can be found from the database or if it needs to be fetched from the content server.

At this stage the raw price information can also be processed with an additional pricing module that for example calculates the tax.

Pre Requisites:
   Service identification
   User identification
   User authentication
   Service Authorisation
Actions:
   Select source for price
   Get price from the source
   Calculate price
Parameters
   User ID
   User group ID
   Service ID
   Service group ID
Results:
   Price for the requested content (for the requesting user)

Price Confirmation

In this stage we check if we should ask price confirmation from the user and if so, ask it. The need for confirmation depends on the following items:
   Requested service
   Service group
   User's account settings If any of these checks result to need for the price confirmation, it is executed.

Pre Requisites:
   Service identification
   User identification
   User authentication
   Service Authorisation
Actions:
   Send a price confirmation dialog to the user
   Check user response
Parameters:
   User ID
   User group ID
   Service ID
   Service group ID
   Account ID
   Price of the service
Results:
   Confirmed price

Payment Method Check

In this stage we check the selected payment method (it is either the default payment method of the particular user or user has selected the payment method during price confirmation)

If the selected payment method is prepaid, we will do the balance check for the prepaid account and a reservation for the payment. If the selected payment method is postpaid, we will check if cost control is in use and if so we will check the balance of the postpaid account.

In the case of credit card payment we should check the validity of the card and that there is credit on the credit card.

Pre Requisites:
Actions:
Parameters:
   Account ID
   Selected payment method
   Price of the service
Results:
   Validated balance check

Service Delivery

In this stage we order the C/S platform or proxy to deliver the actual content to the user.

Pre Requisites:
Actions:
Parameters:
Results:
   Content buyer user gets the content

Payment Actions

In this stage we will do the actual charging of the user. In the case of prepaid payment method we will decrease the balance of the pre-paid account. In the case of post-paid payment method we will check if the cost control is in use and if so we will check the balance and decrease it.
Pre Requisites:
Actions:
Parameters:
   Account ID
   Payment method ID
   Service price
Results:
   Content buyer user is charged

Transaction Storing

In this stage we will store information available so far and generate a transaction ID for it. The transaction is then 'paused' and 'continued' again when the C/S platform or proxy sends an invoking message. The transaction ID is delivered to the C/S platform of proxy
Pre Requisites:
Actions:
Parameters:
Results:
   Transaction ID

Transaction Identification

In this stage we will resolve previously started transaction according to transaction ID received C/S platform or proxy. This includes resolving of the transaction flow and all the previously stored transaction parameters.
Pre Requisites:
Actions:
Parameters:
   Transaction ID
Results:
   All stored parameters for the transaction
   Transaction flow

ER Generation

Figure 5:
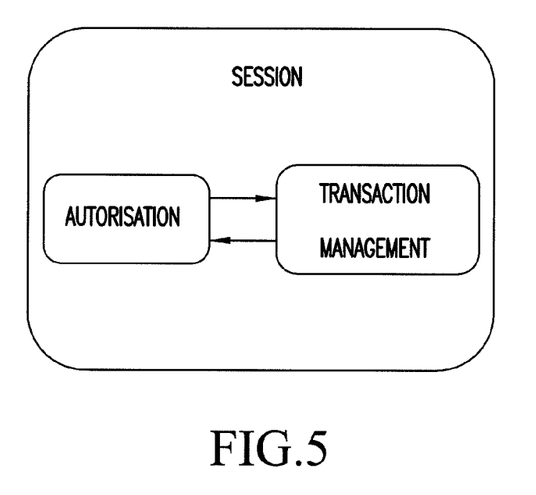
FIG. 5 illustrates the authorisation process in accordance with the invention as a block diagram.

In this stage we generate ERs according to transaction data.
Pre Requisites:
Actions:
Parameters:
   Transaction data
Results:
   ER file
Authorisation Process
   Authorisation process is a combination of Session, Transaction Manager and Authorisation Module.
   It is assumed that a session withholds an authenticated session and conceivably some functional attribute values.
   Transaction Manager executes the rules as is defined by the transaction flow. However, some of these rules (Transaction storing, transaction identification) can shift the authorisation process over to the Authorisation (2) module. It continues the processing according to functional flags. Two flags are specified:
   FetchContent
   ReleaseContent
   If the FetchContent flag is set by the processed rules, the content is fetched from the content server. However, it is not released to the user until the ReleaseContent flag is set. The authorisation process can continue to until the ReleaseContent flag is set.
   The authorisation process serves two purposes in the authorisation process:
   1. It enables the fetching of functional attribute values from the content server.
   2. It enables the uploading of functional attribute values to the content server.
   These are small steps in the overall transaction flow and it is most likely that the authorisation process in accordance with FIG. 5 spends most of its processing time in the Transaction manager. However, in the process of authorisation it must be realised that functional attribute values can reside on different sites. The system simply needs to be able to connect to these external systems and process the information according to predefined rules.
   CSM provides four mechanisms for authorising the content
   1. Transaction flow
   2. Connections to external systems (this is for retrieving functional attribute values for the transaction rules)
   3. Interaction with the content server (authorisation process)
   4. Service management (different views enable the provisioning of functional attributes from any number of views)
   Content is delivered to the user when the whole authorisation process including 0 . . . n transaction rules and 0 . . . n connections to external systems is complete.
Interaction with the Content Server
   There are two ways how the service provider can define the chargeability of a content file. Earlier chapters describe how pattern matching or the use of CSM_CHARGEABLE cookie can be used to control the chargeability.
   CSM_CHARGEABLE cookie is defined as follows:

| | |
|---|---|
| CSM_CHARGEABLE | Valid values for this cookie are YES or NO. If the value of this cookie is NO, the file can be transmitted through the proxy without any interaction with the CSM Core, i.e. this file is transmitted without a fee to the end-user. The default value is YES, i.e. the file triggers in the proxy a request for operation in the transaction management chain. This also causes that the file is not cached in the proxy. |

Other HTTP-headers meaningful to the proxy process are those related to cache control. These are specified in the HTTP specification.
   Combining the pattern matching functionality with the use of cookies gives the Transaction Management additional possibilities. The system is able to interact with the content server and provide it with information. This information can be obtained from the internal system database of CSM or from the external systems using the Transaction Rules and Connections functionality.

Service Management

Content and Service mediation is a process of bringing together the various elements needed to manage and charge for content and services:

This is also critical in the process of authorising content usage. The transaction management process described in the earlier chapters relies on the values of different functional attributes. Service management functions allow the fine-grain management of the transaction flow and different stakeholders. This can be done with any number of service management views.

Figure 6:
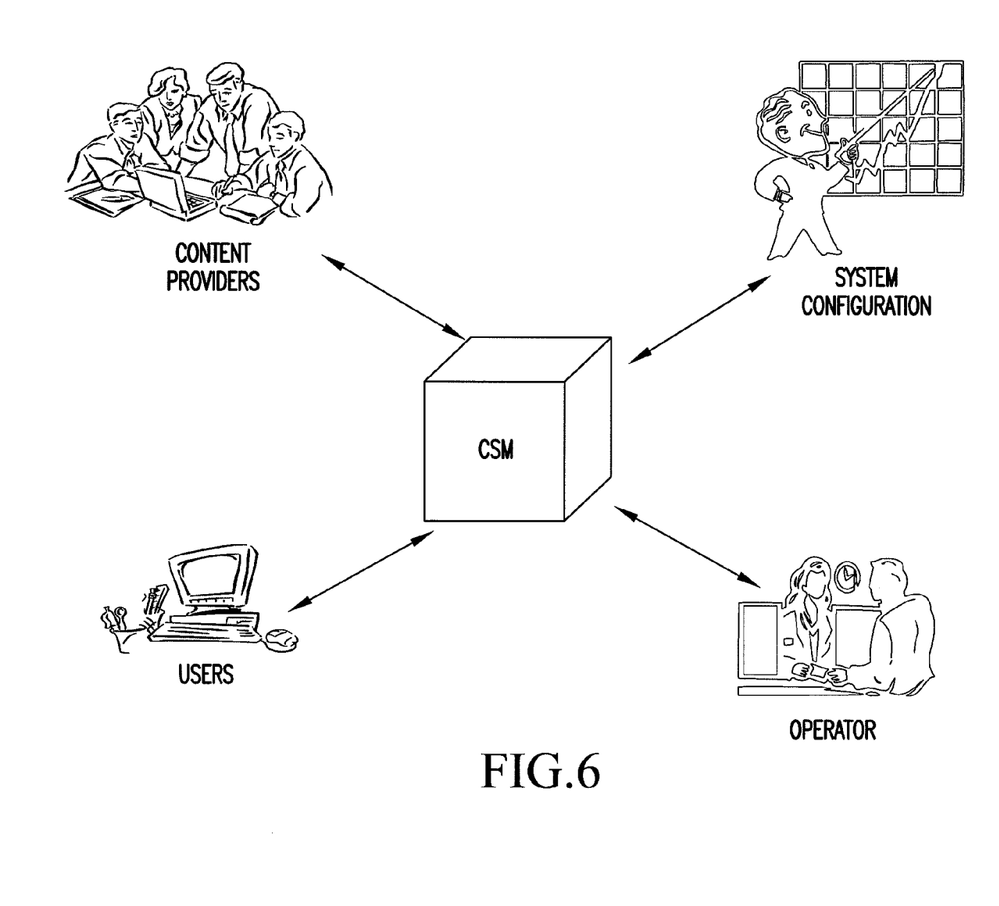
FIG. 6 illustrates the different parties involved with the invention as a block diagram.

In accordance with FIG. 6, Service Management is responsible for creating the environment where these attributes can be managed securely and conveniently.

CSM has a built-in mechanism, which supports the concept of views. A view consists of different subsets of service management functions. This gives the platform operator the possibility to offer a management view for each stakeholder.

The views can be used for attribute administration, in other words with help of the views each party can update attributes, especially those relating to the authorisation part of the transaction flow.

There can be any number of service management views. Depending on the operations and attributes they define the behaviour of the transaction management chain. More precisely, they define how the content used and content charging evens are handled. This brings flexibility to the system.

Toolkit Functionality

Figure 7:
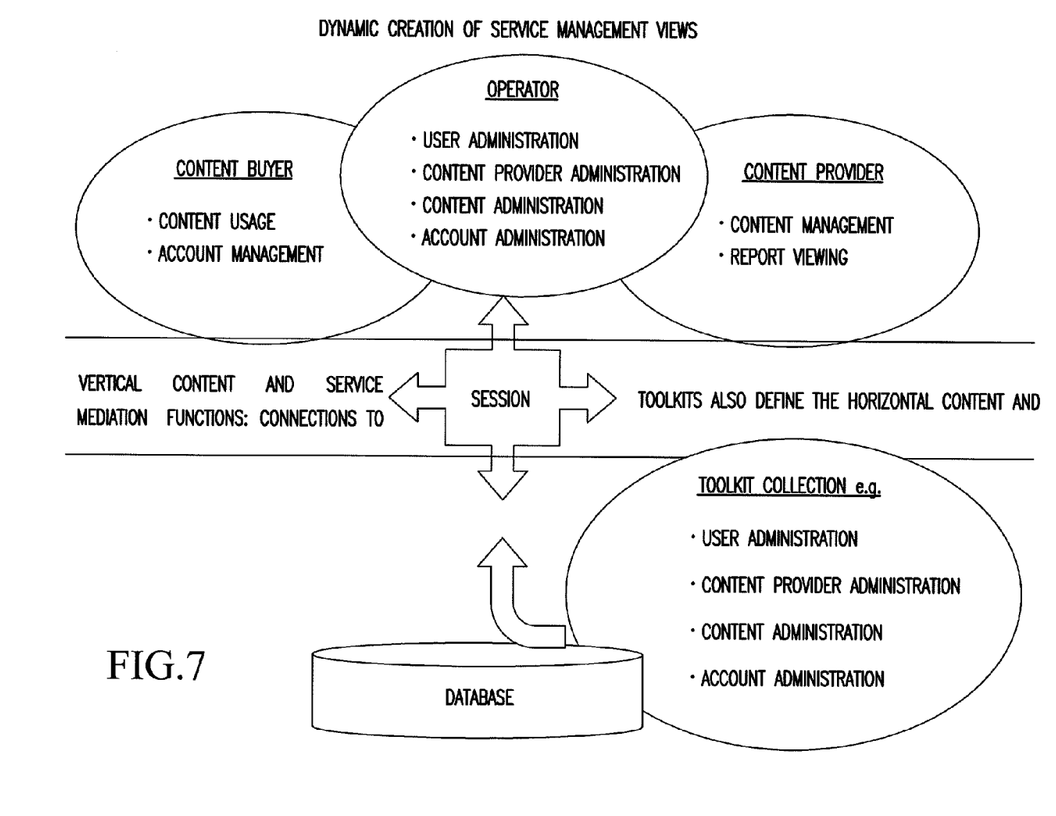
FIG. 7 illustrates the mechanism for building the different service management views as a block diagram.
Figure 8:
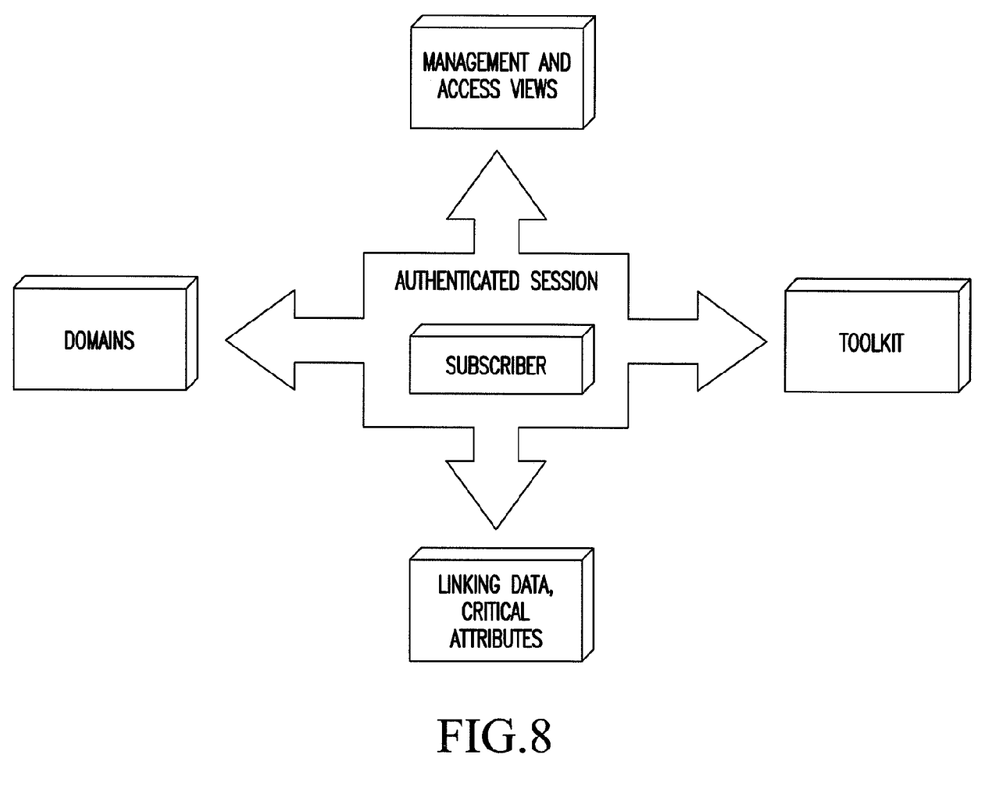
FIG. 8 illustrates the different connections for an authenticated session as a block diagram.

Toolkits are collections of well-targeted operations that create the overall service management functionality. FIG. 7 shows how toolkits can be dynamically assigned to authenticate a session.

The assigned collection defines what type of mediation functions that particular session is entitled to perform.

The views can be considered as content when we inspect the functional relationship to transaction management. Views are built according to the following mechanism:
1. User sends a service management request to the proxy component.
2. The basic transaction management stages are executed: (service identification, user identification).
3. The system notices that the request relates to management views.
4. A predefined transaction flow is triggered.
5. Transaction flow includes a user authentication stage
6. Based on the user authentication results a service authorisation is executed. This involves choosing the authorised management view toolkits. In a way, toolkits relate to transaction flow rules since they are also predefined collections of management functionalities.
7. Service delivery stage provides the user with the authorised toolkit collection as a graphical web-based user interface.
8. User is able to perform any number of service management tasks, defining the attribute values that eventually determine the content usage authorisation functions.

Content Buyer View

Account Management functions provide the content buyer users the ability to group their payment methods. Content buyer users can add and remove their own accounts. They can also add new payment methods and set a price limit for a payment method. In addition, they can set a payment method to be passive and activate it again when they wish.

User Management functions provide the means for modifying user details, for example, email address and phone number. Content buyer users can also change their passwords. Request removal enables the content buyer users to send a request removal message to the operator. This can be useful in service operator environment where the content provider user has been registered to the system for a short period of time. An example of this could be a roaming content buyer user.

Report functions help the content buyers to follow their transactions. They have the possibility to view reports of their personal usage events during a certain time period. They can choose from several report types.

Content Provider View

Content Management functions provide the means to make content chargeable through CSM platform (e.g. Comptel Chinchilla™). In addition to this basic functionality, the content management functions help to organise and manage content details.

With CSM platform (e.g. Comptel Chinchilla™) the content provider can create, rearrange, modify and delete the content folders. Content folders make it possible to easily organise the content services.

Adding new content to CSM platform (e.g. Comptel Chinchilla™) requires a contract between the content provider and operator. The contract defines the valid payment methods, price limits, billing type and terminal types. Once a contract is made, the content provider can freely add, delete and modify his own content services and publish them as chargeable items. A content is described with attributes such as price, key words, status and valid payment methods.

User Administration functions provide the content provider the possibility to add new employees for himself. Adding new content provider users helps the content provider to share responsibilities.

User Administration includes User Management functions, which provide the means for modifying user details, for example email address and phone number. Content provider users can also change their passwords. Request removal enables the users to send a message to the operator.

Content Provider Access Management functions provide the content provider super user the means to give access rights to his employees. When a normal content provider user is created he is only given the tools to modify personal details and password data. With content provider access management content provider super user is able to give access rights for the other content provider view toolkits.

Report functions help the content provider users to receive information on the usage of their content. They do not, however, receive any information about the users. They can choose from several report types Operator View User Administration functions provide the operator the means to add new content buyer, content provider and operator users to the system. Operator is also able to remove users.

User Administration includes User Management functions, which provide the means for modifying user details, for example email address, phone number and password.

Content Provider Administration provides the means to add new content provider to the system. This includes defining a contract between the content provider and operator. With a contract the limits within which the content provider must act can be defined. Also, minimum and maximum prices and payment services that a certain content provider can use can be defined.

Content Administration is an operator level toolkit for managing the content that are stored to the system. Operator can search for and select a content provider and then use the Content Management toolkit for administrating the content details. This function also allows the operator to offer his own content through Comptel Chinchilla™.

Account Administration is an operator level toolkit for managing the user accounts. Operator can search for and select a content buyer user and the use the Account Management toolkit for administering the account and payment method details.

Operator Access Management allows the operator to give access rights to his employees. When a normal operator user is created he is only given the tools to modify personal details and password data. With operator access management operator super user is able to give access rights for the other operator view toolkits.

Utility Administration functions provide the operator the means to administer several system configuration attributes that affect the overall functionality of the platform.

Portal Administration functions give the operator the means to organise content services by creating a hierarchical tree structure. The operator can thus organise the content services of different content providers into a tree structure that could be used to build a portal page for content buyers.

Report functions allow the operator to follow the overall platform usage. Operator can choose any of the report types that the platform offers.

The invention claimed is:

1. A computer controlled online transaction mediation method in a computerized telecommunications system, said method comprising:

carrying out a transaction, according to a transaction flow formed by steps, between an authorized and authenticated user and a service provider during an active authenticated telecommunications session operated by at least one operator of the computerized telecommunications system, wherein the transaction flow for each transaction comprises at least one transaction rule, wherein each transaction rule can be affected by at least one attribute, and wherein each attribute is selected from the group consisting of content attributes, functional attributes, update attributes and system configuration attributes, and modifying at least one attribute which effects the function and/or the execution order of steps of the transaction flow of the transaction, wherein the authorized and authenticated user, the service provider and the operator are all capable of dynamically modifying said at least one attribute.

2. The computer controlled online transaction mediation method in accordance with claim 1, further comprising toolkits, which are collections of well-targeted operations that create overall service management functionality and can be dynamically assigned to authenticate a session, and managing the linking of various functional domains to the authenticated session, linking the toolkits to the session and dynamically changing the toolkits.

3. The computer controlled online transaction mediation method in accordance with claim 1, further comprising linking any number of domains to the authenticated session whereby these domains contain the information required in content and service mediation functions.

4. The computer controlled online transaction mediation method in accordance with claim 1, further comprising offering each party a view with the help of which the attributes can be changed in order to affect the operation of rules or their order.

5. The computer controlled online transaction mediation method in accordance with claim 4, wherein the attributes that can be changed relates to the authorisation part of the transaction flow.

6. The computer controlled online transaction mediation method in accordance with claim 1, further comprising performing fine-grain management of the transaction flow and different stakeholders with Service management functions, including service management views.

7. The computer controlled online transaction mediation method in accordance with claim 1, wherein at least the following transaction flow stages are adapted to depend on the transaction rules:
   user authentication,
   service authorisation,
   price calculation,
   price confirmation,
   payment method/balance check,
   service delivery,
   payment actions,
   transaction storing,
   transaction identification,
   ER generation.

8. The computer controlled online transaction mediation method in accordance with claim 1, further comprising using a computerized transaction manager for executing correct transaction flow, which includes transaction rules.

9. The computer controlled online transaction mediation method in accordance with claim 1, further comprising a computerized content service manager that blocks the delivery of the service reply to the end-user if the end-user does not have enough balance on the prepaid account.

10. The computer controlled online transaction mediation method in accordance with claim 1, further comprising using the toolkits to assign and define what type of mediation functions that a particular telecommunication session is entitled to perform.

11. The computer controlled online transaction mediation method in accordance with claim 1, wherein the system includes an account management toolkit, and the method includes using the account management toolkit to administer details of the account and payment of the account, and giving access rights for other operational level toolkits.

12. The computer controlled online transaction mediation method in accordance with claim 1, wherein the system includes a content toolkit and the method includes using the content toolkit to administer details of the content and to offer content of the operator.

* * * * *